United States Patent [19]

White

[11] Patent Number: 5,732,792
[45] Date of Patent: Mar. 31, 1998

[54] FRUIT PICKING ASSIST MECHANISM

[76] Inventor: Thomas B. White, P.O. Box 2043, Bethel Island, Calif. 94511

[21] Appl. No.: 816,518

[22] Filed: Mar. 13, 1997

[51] Int. Cl.⁶ .................................................. B66F 11/04
[52] U.S. Cl. ............................... 182/62.5; 182/69.4
[58] Field of Search ............................ 182/62.5, 63.1, 182/69.4–69.6; 56/328.1

[56] References Cited

U.S. PATENT DOCUMENTS

| | | | |
|---|---|---|---|
| 3,085,650 | 4/1963 | Merk | 182/63.1 |
| 3,091,305 | 5/1963 | Pickard | 182/69.4 |
| 3,272,282 | 9/1966 | Sanders | 182/69.6 |
| 3,311,191 | 3/1967 | Hiyama | 182/63.1 |
| 3,352,380 | 11/1967 | Barney | 182/62.5 |
| 3,356,181 | 12/1967 | Granger | 182/69.4 |
| 3,537,236 | 11/1970 | Fridley | 182/63.1 |
| 5,427,197 | 6/1995 | Waters | 182/69.4 |

*Primary Examiner*—Alvin C. Chin-Shue

[57] ABSTRACT

A new Fruit Picking Assist Mechanism for assisting fruit pickers and people pruning fruit trees. The inventive device includes a wheeled vehicle, a plurality of remote working platforms provided on opposite sides of the wheeled vehicle wherein the plurality of remote working platforms are vertically and horizontally maneuverable with respect to the wheeled vehicle, and a fruit transporting system for transferring picked fruit from each of the plurality of remote working platforms to the wheeled vehicle.

10 Claims, 4 Drawing Sheets

FRUIT PICKING ASSIST MECHANISM

BACKGROUND OF THE INVENTION

1. Field of the Invention

The present invention relates to elevating platforms and more particularly pertains to a new Fruit Picking Assist Mechanism for assisting fruit pickers and people pruning fruit trees.

2. Description of the Prior Art

The use of elevating platforms is known in the prior art. More specifically, elevating platforms heretofore devised and utilized are known to consist basically of familiar, expected and obvious structural configurations, notwithstanding the myriad of designs encompassed by the crowded prior art which have been developed for the fulfillment of countless objectives and requirements.

Known prior art elevating platforms include U.S. Pat. Nos. 3,664,459; 3,826,334; 4,890,692; 4,019,781; 4,690,250; and 5,297,653.

While these devices fulfill their respective, particular objectives and requirements, the aforementioned patents do not disclose a new Fruit Picking Assist Mechanism. The inventive device includes a wheeled vehicle, a plurality of remote working platforms provided on opposite sides of the wheeled vehicle wherein the plurality of remote working platforms are vertically and horizontally maneuverable with respect to the wheeled vehicle, and a fruit transporting system for transferring picked fruit from each of the plurality of remote working platforms to the wheeled vehicle.

In these respects, the Fruit Picking Assist Mechanism according to the present invention substantially departs from the conventional concepts and designs of the prior art, and in so doing provides an apparatus primarily developed for the purpose of assisting fruit pickers and people pruning fruit trees.

SUMMARY OF THE INVENTION

In view of the foregoing disadvantages inherent in the known types of elevating platforms now present in the prior art, the present invention provides a new Fruit Picking Assist Mechanism construction wherein the same can be utilized for assisting fruit pickers and people pruning fruit trees.

The general purpose of the present invention, which will be described subsequently in greater detail, is to provide a new Fruit Picking Assist Mechanism apparatus and method which has many of the advantages of the elevating platforms mentioned heretofore and many novel features that result in a new Fruit Picking Assist Mechanism which is not anticipated, rendered obvious, suggested, or even implied by any of the prior art elevating platforms, either alone or in any combination thereof.

To attain this, the present invention generally comprises a wheeled vehicle, a plurality of remote working platforms provided on opposite sides of the wheeled vehicle wherein the plurality of remote working platforms are vertically and horizontally maneuverable with respect to the wheeled vehicle, and a fruit transporting system for transferring picked fruit from each of the plurality of remote working platforms to the wheeled vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Fruit Picking Assist Mechanism apparatus and method which has many of the advantages of the elevating platforms mentioned heretofore and many novel features that result in a new Fruit Picking Assist Mechanism which is not anticipated, rendered obvious, suggested, or even implied by any of the prior art elevating platforms, either alone or in any combination thereof.

It is another object of the present invention to provide a new Fruit Picking Assist Mechanism which may be easily and efficiently manufactured and marketed.

It is a further object of the present invention to provide a new Fruit Picking Assist Mechanism which is of a durable and reliable construction.

An even further object of the present invention is to provide a new Fruit Picking Assist Mechanism which is susceptible of a low cost of manufacture with regard to both materials and labor, and which accordingly is then susceptible of low prices of sale to the consuming public, thereby making such Fruit Picking Assist Mechanism economically available to the buying public.

Still yet another object of the present invention is to provide a new Fruit Picking Assist Mechanism which provides in the apparatuses and methods of the prior art some of the advantages thereof, while simultaneously overcoming some of the disadvantages normally associated therewith.

Still another object of the present invention is to provide a new Fruit Picking Assist Mechanism for assisting fruit pickers and people pruning fruit trees.

Yet another object of the present invention is to provide a new Fruit Picking Assist Mechanism which includes a wheeled vehicle, a plurality of remote working platforms provided on opposite sides of the wheeled vehicle wherein the plurality of remote working platforms are vertically and horizontally maneuverable with respect to the wheeled vehicle, and a fruit transporting system for transferring picked fruit from each of the plurality of remote working platforms to the wheeled vehicle.

3

Still yet another object of the present invention is to provide a new Fruit Picking Assist Mechanism that includes a portable scaffolding system that places fruit pickers in an ideal position for picking fruit from fruit trees.

Even still another object of the present invention is to provide a new Fruit Picking Assist Mechanism that would make commercial farming of fruit trees more cost effective and less labor intensive thereby increasing the efficiency of a fruit harvesting operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
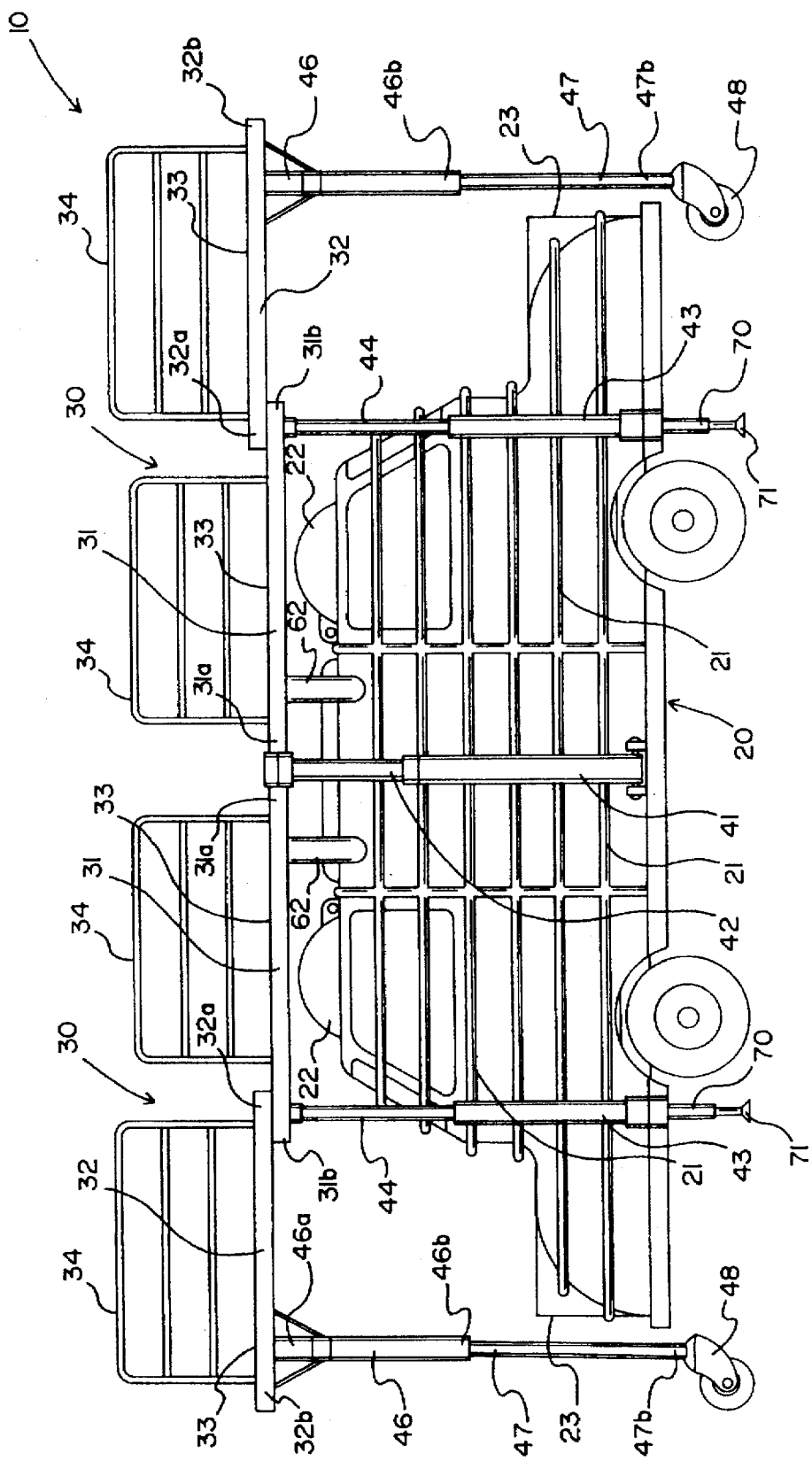
FIG. 1 a side view of a new Fruit Picking Assist Mechanism according to the present invention.
Figure 2:
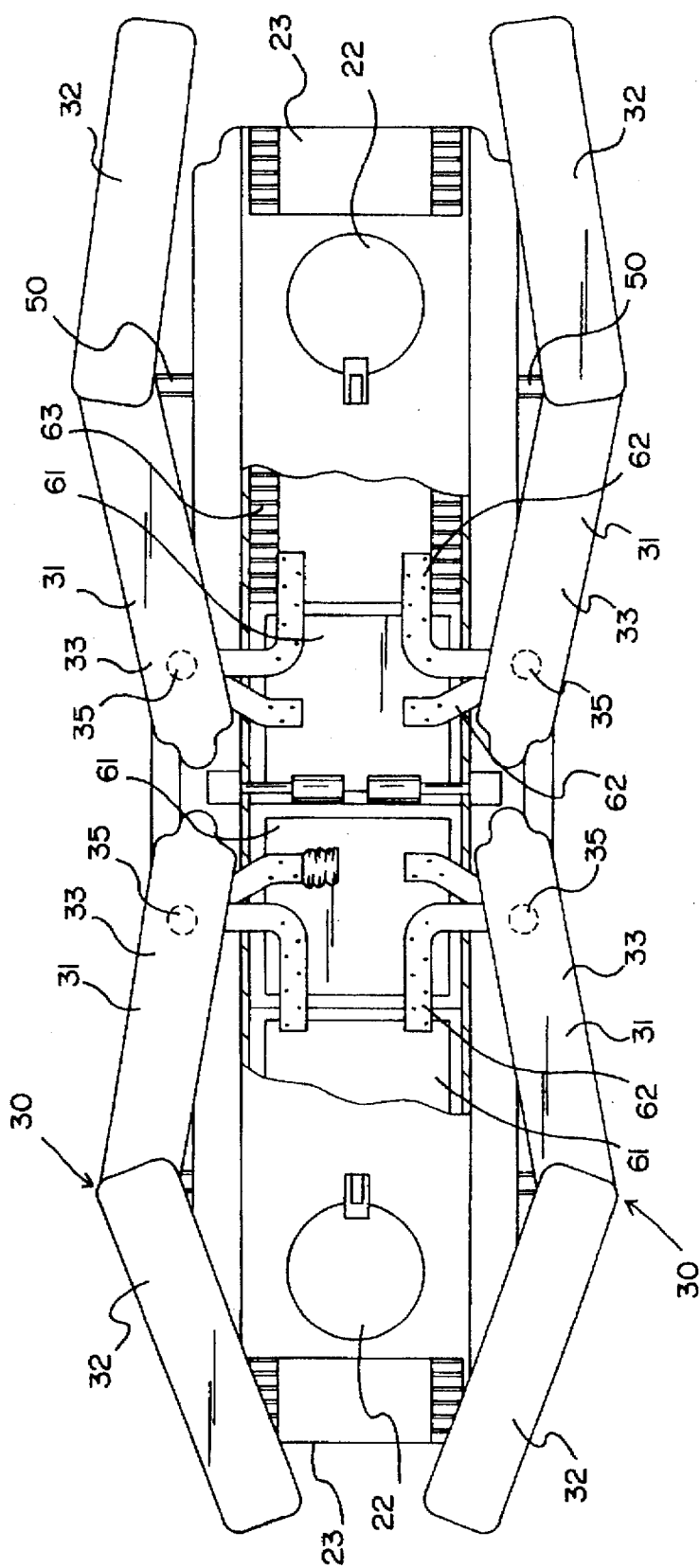
FIG. 2 is a top view of the present invention.
Figure 3:
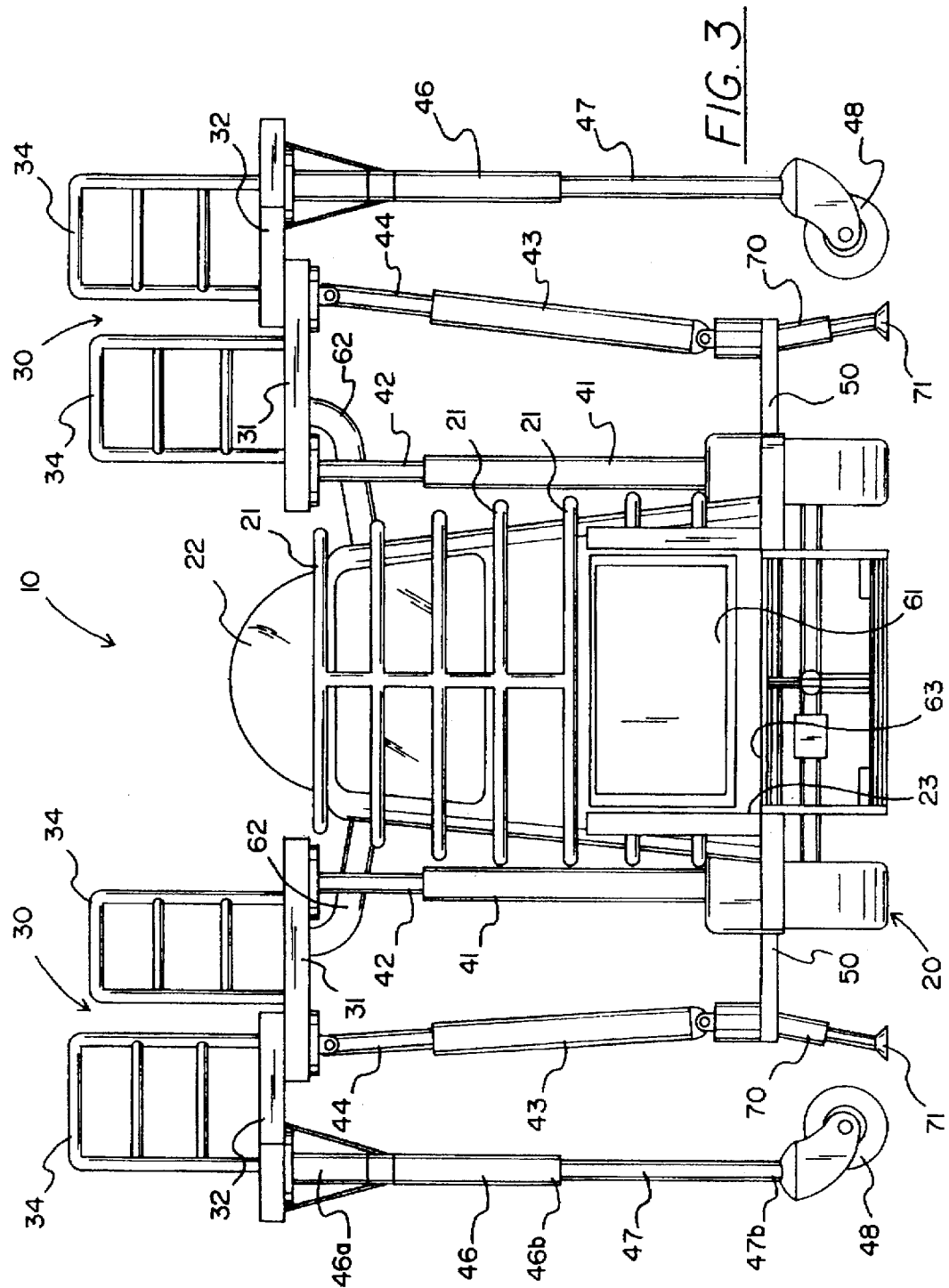
FIG. 3 is a rear view of the present invention.

With reference now to the drawings, and in particular to FIGS. 1 through 4 thereof, a new Fruit Picking Assist Mechanism embodying the principles and concepts of the present invention and generally designated by the reference numeral 10 will be described.

More specifically, it will be noted that the Fruit Picking Assist Mechanism 10 comprises a wheeled vehicle 20, a plurality of remote working platforms 30 provided on opposite sides of the wheeled vehicle 20 wherein the plurality of remote working platforms 30 are vertically and horizontally maneuverable with respect to the wheeled vehicle 20, and a fruit transporting system 60 for transferring picked fruit from each of the plurality of remote working platforms 30 to the wheeled vehicle 20.

As best illustrated in FIGS. 1 through 4, it can be shown that the wheeled vehicle 20 includes a plurality of spaced horizontal members 21 projecting from the sides thereof. The plurality of spaced horizontal members 21 form a ladder structure which a worker can use for climbing up to and down from the plurality of remote working platforms 30. The wheeled vehicle 20 also includes a clear, dome-shaped roof 22 that allows a driver thereof to observe workers positioned on the plurality of remote working platforms 30.

The plurality of remote working platforms 30 are pivotally connected to the wheeled vehicle 20 and are vertically and horizontally maneuverable with respect to the wheeled vehicle 20. The plurality of remote working platforms 30 are vertically positionable at any height between a maximum working height and a minimum working height. Each of the plurality of remote working platforms 30 includes a first platform section 31 and a second platform section 32 pivotally coupled to the first platform section 31. As such, the second platform section 32 is horizontally pivotable with respect to the first platform section 31. The first platform

4 section 31 and the second platform 32 section each have a first end 31a and 32a and a second end 31b and 32b.

Figure 4:
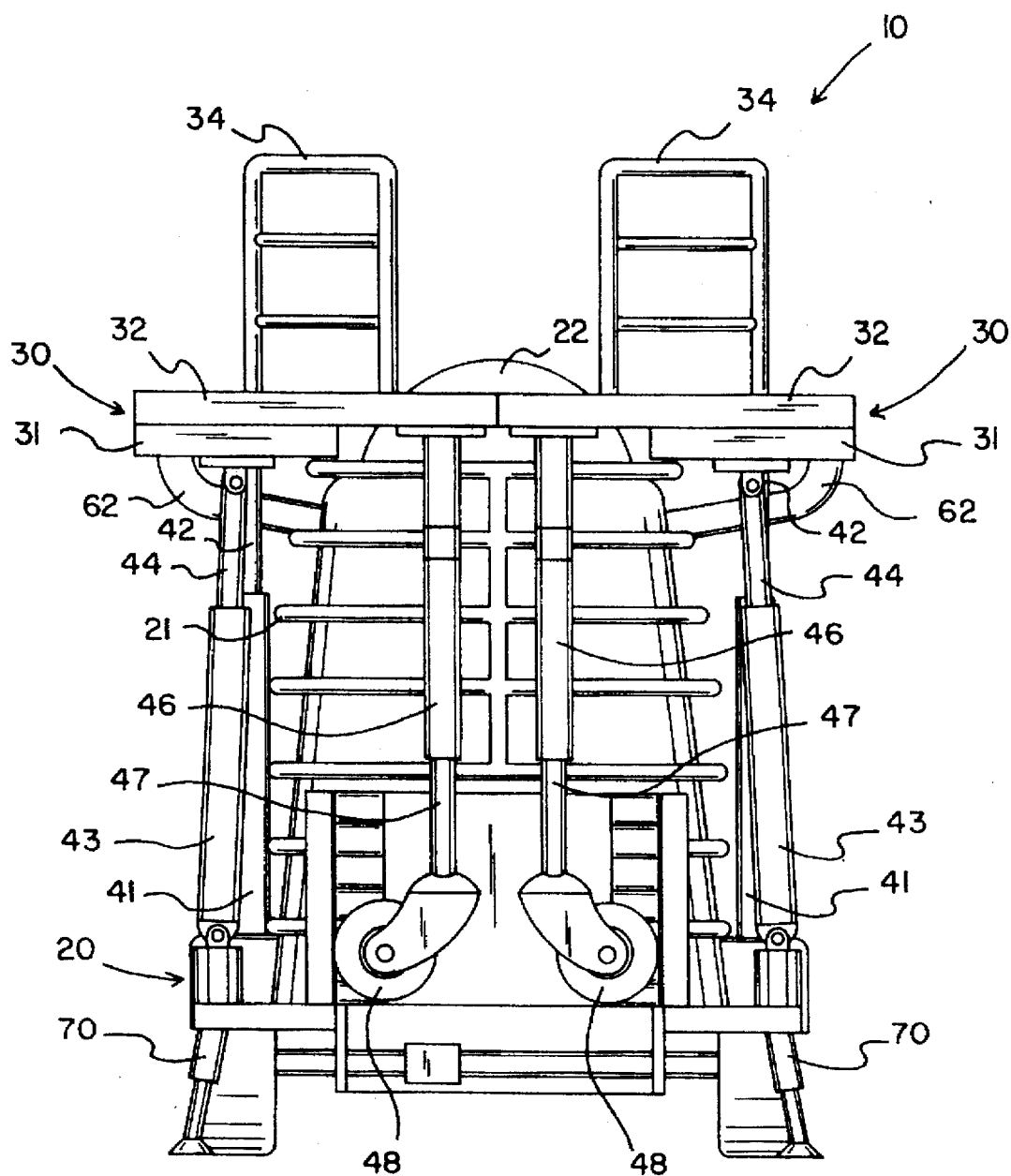
FIG. 4 is a rear view of the present invention in a transportable mode.

Each of the plurality of remote working platforms 30 includes a floor 33 and a guardrail 34 extending above the floor 33. The floor 33 of each of the plurality of remote working platforms 30 has a hole 35 therein. The hole 35 is adapted for receiving picked fruit. Each of the plurality of remote working platforms 30 are collapsable to a transport mode for transportation of the wheeled vehicle 20 (FIG. 4).

As best illustrated in FIGS. 1 through 4, it can be shown that a vertical positioning means 40 is provided for vertically positioning each of the plurality of remote working platforms 30 and a horizontal positioning means 50 is provided for horizontally positioning each of the plurality of remote working platforms 30. The vertical positioning means 40 and the horizontal positioning means 50 are remotely controllable from each of the plurality of remote working platforms 30.

The vertical positioning means 40 comprises a primary vertically oriented hydraulic cylinder 41 including a primary vertically extendable hydraulic cylinder rod 42, a secondary vertically oriented hydraulic cylinder 43 including a secondary vertically extendable hydraulic cylinder rod 44, and a telescoping vertical support 45. The primary vertically oriented hydraulic cylinder 41 is coupled to the wheeled vehicle 20 and the primary vertically extendable hydraulic cylinder rod 42 is coupled to and supports the first end 31a of the first platform section 30. The secondary vertically oriented hydraulic cylinder 43 is coupled to the horizontal positioning means 50 and the secondary vertically extendable hydraulic cylinder rod 44 is coupled to and supports the second end 31b of the first platform section 31 and the first end 32a of the second platform section 32. The telescoping vertical support 45 is coupled to and supports the second end 32b of the second platform section 32. The horizontal positioning means 50 comprises a horizontally oriented hydraulic cylinder 51 coupled to the wheeled vehicle 20 and the secondary vertically oriented hydraulic cylinder 43.

The telescoping vertical support 45 comprises a sleeve member 46 secured to the second end 32b of the second platform section 32 and an extension member 47 matingly coupled within and vertically extendable from the sleeve member 46. The sleeve member 46 has a first end 46a and a second end 46b wherein the first end 46a of the sleeve member 46 is secured to the underside of the second end 32b of the second platform section 32 and tile extension member 47 extends vertically downward from the second end 46b of the sleeve member 46. The extension member 47 has a first end 47a and a second end 47b wherein the first end 47a of the extension member 47 is matingly coupled within the sleeve member 46 and the second end 47b of the extension member 47 includes a pivotable wheel 48 that contacts the underlying ground surface.

An outrigger 70 is provided for stabilizing the wheeled vehicle 20 with respect to the underlying ground surface and for supporting the plurality of remote working platforms 30. The outrigger 70 includes a ground engaging foot 71 telescopingly extendable beyond the wheeled vehicle 20 for contact with the underlying ground surface.

A fruit transporting system 60 is provided for transferring picked fruit from the plurality of remote working platforms 30 to the wheeled vehicle 20. The fruit transporting system 60 comprises a storage bin 61 located within the wheeled vehicle 20 for storing picked fruit, a delivery chute 62 interconnecting tile hole 35 provided in the floor 33 of each of the plurality of remote working platforms 30 and the storage bin 61, and a conveyor system 63 within the wheeled vehicle 20 for conveyance of the storage bin 61 within the wheeled vehicle 20. The delivery chute 62 is adapted for following vertical and horizontal movement of one of the plurality of remote working platforms 30 and the wheeled vehicle 20 has an open end 23 for receiving and discharging the storage bin 61.

In use, a worker uses the plurality of spaced horizontal members 21 projecting from the sides of the wheeled vehicle 20 to climb up to the plurality of remote working platforms 30. The plurality of remote working platforms 30 are vertically and horizontally maneuvered with respect to the wheeled vehicle 20 so as to place the worker in an ideal position for picking fruit from a fruit tree. After the worker picks the fruit, the picked fruit is then transferred from the plurality of remote working platforms 30 to a storage bin 61 located within the wheeled vehicle 20. To transfer the picked fruit from the plurality of remote working platforms 30 to the storage bin 61, the picked fruit is inserted through the hole 35 provided in the floor 33 of one of the plurality of remote working platforms 30. As such, the picked fruit travels through the delivery chute 62 and into the storage bin 61. When the storage bin 61 is full, the storage bin 61 is moved through the wheeled vehicle 20 by the conveyor system 63 and discharged out the open end 23 of the wheeled vehicle 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by LETTERS PATENT of the United States is as follows:

1. A fruit picking assist mechanism comprising:

a wheeled vehicle;

a plurality of remote working platforms provided on opposite sides of said wheeled vehicle, said plurality of remote working platforms vertically and horizontally maneuverable with respect to said wheeled vehicle;

each of said plurality of remote working platforms including a first platform section and a second platform section, said first platform section and said second platform section each having a first end and a second end, said first end of said second platform section pivotally coupled to said second end of said first platform section;

a vertical positioning means for vertically positioning said plurality of remote working platforms; said vertical positioning means including a primary vertically oriented hydraulic cylinder including a primary vertically extendable hydraulic cylinder rod, said primary vertically oriented hydraulic cylinder coupled to said wheeled vehicle and said primary vertically extendable hydraulic cylinder rod coupled to and supporting said first end of said first platform section;

a horizontal positioning means for horizontally positioning said plurality of remote working platforms, said horizontal positioning means including a secondary vertically oriented hydraulic cylinder including a secondary vertically extendable hydraulic cylinder rod, said secondary vertically oriented hydraulic cylinder coupled to said horizontal positioning means and said secondary vertically extendable hydraulic cylinder rod coupled to and supporting said second end of said first platform section and said first end of said second platform section; and a telescoping vertical support, said telescoping vertical support coupled to and supporting said second end of said second platform section.

2. The fruit picking assist mechanism of claim 1, wherein said vertical positioning means and said horizontal positioning means are remotely controllable from said plurality of remote working platforms.

3. The fruit picking assist mechanism of claim 1, wherein said horizontal positioning means comprises:

a horizontally oriented hydraulic cylinder coupled to said wheeled vehicle and said secondary vertically oriented hydraulic cylinder.

4. The fruit picking assist mechanism of claim 1, wherein said telescoping vertical support comprises:

a sleeve member having a first end and a second end, said first end secured to said second end of said second platform section, and an extension member matingly coupled within said sleeve member and vertically extendable from said second end of said sleeve member.

5. The fruit picking assist mechanism of claim 4, wherein said extension member includes a pivotable wheel for contacting an underlying ground surface.

6. The fruit picking assist mechanism of claim 1, further comprising:

an outrigger extendable beyond said wheeled vehicle for stabilizing said wheeled vehicle with respect to an underlying ground surface and for supporting said plurality of remote working platforms.

7. The fruit picking assist mechanism of claim 1, further comprising:

a fruit transporting system for transferring picked fruit from said plurality of remote working platforms to said wheeled vehicle.

8. The fruit picking assist mechanism of claim 7, wherein each of said plurality of remote working platforms includes a floor having a hole therein, said hole adapted for receiving picked fruit, and wherein said fruit transporting system comprises;

a storage bin located within said wheeled vehicle, a delivery chute interconnecting said hole provided in said floor of each of said plurality of remote working platforms and said storage bin, said delivery chute adapted for following vertical and horizontal movement of one of said plurality of remote working platforms, and a conveyor system within said wheeled vehicle for conveyance of said storage bin within said wheeled vehicle.

9. The fruit picking assist mechanism of claim 8, wherein said wheeled vehicle has an open end for receiving and discharging said storage bin.

10. The fruit picking assist mechanism of claim 1, wherein said wheeled vehicle includes a plurality of spaced horizontal members projecting from the sides thereof, said plurality of spaced horizontal members forming a ladder structure which a worker can use for climbing up to and down from said plurality of remote working platforms.

* * * * *